US006576309B2

(12) United States Patent
Dalgewicz, III et al.

(10) Patent No.: US 6,576,309 B2
(45) Date of Patent: *Jun. 10, 2003

(54) THERMOPLASTIC COMPOSITIONS HAVING HIGH DIMENSIONAL STABILITY

(75) Inventors: Edward J. Dalgewicz, III, Fletcher, NC (US); John Bond, deceased, late of Pittsburgh, PA (US), by Adriana Bond, legal representative

(73) Assignee: Associated Packaging Enterprises, Waynesville, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/453,457

(22) Filed: Dec. 2, 1999

(65) Prior Publication Data

US 2002/0055586 A1 May 9, 2002

(51) Int. Cl.⁷ .............................................. B29D 22/00
(52) U.S. Cl. .................. 428/36.8; 428/35.7; 428/36.92; 525/64; 525/166; 525/176
(58) Field of Search .......................... 525/166, 64, 176; 428/35.7, 36.8, 36.91, 36.92

(56) References Cited

U.S. PATENT DOCUMENTS

| | | | |
|---|---|---|---|
| 3,960,807 A | 6/1976 | McTaggart | |
| 4,753,980 A | 6/1988 | Deyrup | |
| 4,946,918 A | 8/1990 | Akiyama et al. | |
| 4,981,631 A | 1/1991 | Cheung et al. | |
| 4,983,660 A | 1/1991 | Yoshida et al. | |
| 5,109,060 A | 4/1992 | Fischer | |
| 5,211,662 A | 5/1993 | Barrett et al. | |
| 5,346,733 A | * 9/1994 | Dalgewicz | 428/35.7 |
| 5,409,967 A | 4/1995 | Carson et al. | |
| 5,418,108 A | 5/1995 | Kmiecik-Lawrynowicz et al. | |
| 5,436,296 A | 7/1995 | Swamikannu et al. | |
| 5,562,997 A | 10/1996 | Krejci et al. | |
| 6,020,414 A | 2/2000 | Nelsen et al. | |

FOREIGN PATENT DOCUMENTS

| | | |
|---|---|---|
| EP | 0 747 070 A2 | 12/1996 |
| EP | 0 838 501 A2 | 4/1998 |
| JP | 01247454 | * 10/1989 |
| JP | 3-122158 | * 5/1991 |
| JP | 3122158 | 10/1991 |
| WO | WO 93/15146 | 8/1993 |
| WO | WO 99/37707 | 7/1999 |
| WO | WO 00/23520 | 4/2000 |
| WO | WO 01/09245 A1 | 2/2001 |

OTHER PUBLICATIONS

Gravalos, In situ compatibilization of poly(ethylene terephthalate)/poly (ethylene–co–ethyl acrylate) blends; Polymer, 1995, pp. 1393–1399, vol. 36 No. 7.

* cited by examiner

Primary Examiner—Patricia A. Short
(74) Attorney, Agent, or Firm—Banner & Witcoff, Ltd.

(57) ABSTRACT

Thermoplastic compositions comprising a bulk polymer, an additive, and a compatibilizer/emulsifier/surfactant (CES) are described. The bulk polymer comprises an alkylene terephthalate or naphthalate polyester such as polyethylene terephthalate. The additive comprises an amorphous or substantially amorphous co-polymer of ethylene and a co-monomer that forms polar portions, such as methacrylate, butylacrylate, ethyl acrylate, or ethylhexyl methacrylate. The CES comprises a co-polymer or ter-polymer of ethylene and a glycidyl acrylate or maleic anhydride, and optionally an acrylate such as methacrylate, ethylacrylate, propylacrylate, butylacrylate, ethylhexylacrylate, or mixtures thereof. The thermoplastic compositions of the present invention exhibit improved molding properties, high dimensional stability, high temperature resistance, and are particularly useful in food-grade applications such as dual-ovenable containers.

52 Claims, No Drawings

THERMOPLASTIC COMPOSITIONS HAVING HIGH DIMENSIONAL STABILITY

FIELD OF THE INVENTION

The present invention is directed to polymeric materials and, more particularly, to thermoplastic polyester compositions having high dimensional stability at elevated temperatures with improved toughness, which especially are useful in food-grade applications such as dual-ovenable containers.

BACKGROUND OF THE INVENTION

Polyesters are polymeric materials typically made by a condensation reaction of dibasic acids and dihydric alcohols. Common examples of polyesters include alkylene terephthalate and naphthalate polymers such as polyethylene terephthalate (PET), polybutylene terephthalate (PBT), polyethylene naphthalate (PEN), polycycloterephthate (PCT), polycycloterephthatlic acid (PCTA), (poly)ethylene-co-1,4-cyclohexanedimethylene terephthalate (PETG), and polytrimethylene terephthalate (PTT). Polyethylene terephthalate (PET) and polybutylene terephthalate (PBT) are examples of polyesters having excellent barrier properties, excellent chemical resistance, good dimensional stability at room temperature, and high abrasion resistance. However, polyalkylene terephthalates tend to become brittle upon crystallization, especially upon thermal crystallization, and are not dimensionally stable at temperatures above their glass transition temperature ($T_g$). As a consequence, non-oriented, thermally crystallized polyalkylene terephthalates have poor ductility, poor impact resistance, and poor heat resistance, which limit the utility of the polymer in many applications.

Several attempts have been made to improve the impact properties of polyalkylene terephthalates, including the addition of various impact modifiers as described in U.S. Pat. Nos. 4,172,859, 4,284,540, and 4,753,980. U.S. Pat. No. 4,753,980 discloses the use of an ethylene/n-butylene acrylate/glycidyl methacrylate ter-polymer to produce toughened polyester.

Another class of polymer having widespread utility is polyethylenes, which are ethylene-based polyolefin polymers. Polyethylenes most often are linear but also can be branched. Linear polyethylenes typically are classified by density, e.g., low-density polyethylene (LDPE), medium-density polyethylene (MDPE), high-density polyethylene (HDPE), and the like. Polyethylenes exhibit good toughness, low moisture absorption, high chemical resistance, excellent electrical insulating properties, low coefficient of friction, and ease of processing. However, polyethylenes have poor load-bearing and gas barrier characteristics, and relatively poor heat resistance properties.

Numerous attempts have been made to combine polyalkylene terephthalates and polyethylene polymers in efforts to realize the above-described useful properties of each of the two types of polymer. However, polyalkylene terephthalates and polyethylenes are highly incompatible because of their significantly different physical and chemical properties, such as solubility, surface tension, and polarity. Combining the two polymers typically results in a phase-separated blend exhibiting poor mechanical properties, especially impact properties. In addition, each of the polymers retains its own thermal properties. Therefore, the phase-separated blend thermally degrades at the lower degradation temperature of the two polymers. Such a blend is entirely unsatisfactory.

Various thermoplastic elastomers have been proposed to improve the compatibility of polyalkylene terephthalates and polyethylenes. Traugott et at., *J. Appl. Poly. Sci.*, 28, 2947 (1983), describes blends of polyethylene terephthalate and high density polyethylene (PET/HDPE) which are said to exhibit high ductility. The blend compositions utilize up to 20 weight percent of a styrene/ethylene-butadiene/styrene tri-block co-polymer (SEBS) or an ethylene-propylene co-polymer as a compatibilizing thermoplastic elastomer.

The relatively large concentrations of the thermoplastic elastomers which are required to improve compatibility, however, can diminish other desirable properties of the polymer blends, most notably impact properties and thermal stabilities. U.S. Pat. No. 5,436,296 describes a co-polymer of a $C_2$–$C_{10}$ alpha-olefin and a glycidyl or isocyanate group-containing functional compound which is said to compatibilize thermoplastic blends of polyalkylene terephthalates and polyethylenes while improving impact properties and heat resistance. The thermoplastic blend is described as a continuous matrix of polyalkylene terephthalate with polyethylene domains dispersed therein.

Food grade containers which can be used for cooking or reconstituting foodstuffs are of particular interest. Such containers, whether disposable or intended for re-use, typically are heated to temperatures exceeding 250° F. and must be capable of being heated to at least about 350–400° F. without significant distortion of the rigid package if the container is to be considered ovenable. Food containers made of polymeric materials are used in a wide variety of applications. For example, foamed polystyrene is widely used in making hot drink cups. It is also used in making "clam shells" which are used by the fast food industry as packages for hamburgers and other types of sandwiches. One drawback associated with the use of polystyrene is the possible migration of residual styrene into food products, especially when the container is reheated, e.g., by a microwave oven. There are strict limitations on the quantities of styrene and various other plastics components which may be liberated from a plastic container into food in the container.

The wide spread popularity of microwave ovens for home use has initiated interest in food trays which can be used in either microwave ovens or convection ovens. Such trays are of particular value as containers for frozen prepared foods. It is important for such trays to have good impact strength and dimensional stability at both freezer and oven temperatures. Of course, it also is important for such trays to be capable of withstanding rapid heating from freezer temperatures of about −22° F. to oven temperatures exceeding about 250° F.

Containers which are capable of being heated in either convection ovens or microwave ovens are sometimes described as being dual-ovenable. Polyesters are highly suitable for use in making such dual-ovenable containers. However, it is important for the polyester to be in the crystalline state rather than the amorphous state in order to achieve satisfactory high temperature stability. Normally, polyesters will undergo crystallization by heat treatment at elevated temperatures and the crystallites formed will remain substantially stable up to near the melting point of the polyester. As a general rule, dual-ovenable containers which are comprised of polyester will be heat-treated to attain a crystallinity of higher than about 20%.

Injection molding and thermoforming are widely known methods for forming thermoplastic polyester articles. In injection molding, the polyester is heated above its melting point and injected under sufficient pressure to force the molten polyester to fill the mold cavity. The molten polyester is cooled in the mold until it is rigid enough to be removed. Injection molding of a polyester composition containing 0.5% to 10% by weight isotactic polybutene-1 is described in U.S. Pat. No. 3,839,499. This injection molding method, however, generally is not satisfactory for the production of thin walled articles, such as dual-ovenable trays, due to flow lines and layering which develop during the filling of the mold which lead to non-uniform properties, surface irregularities, and warping of the finished article.

Thermoforming is another process which is used commercially in the production of polyester articles. It is a particularly valuable technique for use in producing thin walled articles, such as dual-ovenable food trays, on a commercial basis. In thermoforming, a sheet of preformed polyester is preheated to a temperature sufficient to allow deformation of the sheet. The sheet is then made to conform to the contours of a mold by such means as vacuum assist, air pressure assist, or matched mold assist. The thermoformed article produced is normally heat treated in the mold in order to attain a crystallinity of at least about 20%.

Crystallization rates generally can be improved by including a small amount of a nucleating agent in polyester compositions. For example, U.S. Pat. No. 3,960,807 describes a process for thermoforming articles from a polyester composition having an intrinsic viscosity (I.V.) of at least 0.75 which is comprised of (1) a crystallizable polyester, (2) a crack stopping agent, preferably a polyolefin, and (3) a nucleating agent. Polyester articles which are made utilizing such compositions generally have improved mold release characteristics and improved impact strength. Additionally, the utilization of such modified polyester compositions results in faster thermoforming cycle times due to the associated faster rate of crystallization. U.S. Pat. No. 4,981,631 describes thermoforming a substantially amorphous cellular sheet which is comprised of (a) from about 94 to 99 wt % polyethylene terephthalate having an I.V. of at least 0.7 dl/g, (b) from about 1 to 6 wt % of at least one polyolefin, and (c) a sufficient amount of inert gas cells to provide the cellular sheet with a density within the range of about 0.4 to 1.25. Thermoforming is said to be carried out in a heated mold for a time sufficient to achieve a crystallinity of from about 5% to 45%.

U.S. Pat. No. 5,409,967 describes an amorphous, aromatic polyester such as PET having an initial I.V. of at least 0.7 dl/g blended with an impact modifier. The impact modifier is described as a core-shell polymer with cores comprised mainly of rubbery polymers of diolefins and vinyl aromatic monomers, and shells comprised mainly of styrene co-polymers such as styrene and hydroxyalkyl (meth) acrylate. The impact modifier is said to substantially increase impact strength of amorphous, aromatic polyesters without detracting from clarity (transparency).

Polyesters presently used in dual-ovenable trays generally are required to have an I.V. of at least 0.95 dl/g in order for the heat-set articles to be food-grade, to have sufficient impact strength at low temperatures (e.g., as in a freezer), and to have sufficient toughness and dimensional stability over a broad temperature range.

It would be desirable to develop a polyester composition having improved molding properties, especially one which is a thermoplastic composition having high dimensional stability, and high temperature resistance, which is thermally stable (e.g., capable of being reprocessed or recycled without loss of toughness or generation of degradation by-products), and which is useful in food-grade applications such as in making dual-ovenable containers. It would be especially desirable to develop a toughener additive which permits the use of polyesters having lower I.V. (e.g., less than 0.95) in heat-set articles which are food-grade, which have high dimensional stability and high temperature resistance, which are thermally stable, and which additionally retain toughness, especially at low temperatures.

SUMMARY OF THE INVENTION

According to one embodiment, the present invention is directed to a polyester thermoplastic composition comprising a bulk polymer, an additive in a concentration from about 4 wt % to about 40 wt %, and a compatibilizer/emulsifier/surfactant (CES) in a concentration from about 0.1 wt % to about 8 wt %, based on the total weight of the composition. The bulk polymer comprises an alkylene terephthalate or naphthalate polyester such as polyethylene terephthalate (PET). The additive comprises an amorphous or substantially amorphous co-polymer of ethylene and at least one co-monomer that forms polar portions, such as an acrylate, e.g., methacrylate, butylacrylate, ethyl acrylate, ethylhexyl methacrylate, or a mixture thereof. The CES comprises a grafted or backbone co-polymer or ter-polymer of ethylene and a glycidyl acrylate or maleic anhydride, and optionally methacrylate, butylacrylate, ethyl acrylate, ethylhexyl methacrylate, or mixtures thereof.

According to another embodiment of the present invention, an additive for providing toughness to a thermoplastic composition consists essentially of a substantially amorphous ethylene co-polymer with an acrylate co-monomer concentration of from about 7 wt % to about 40 wt %, based on the total weight of the co-polymer, and optionally a core-shell toughener.

According to another embodiment of the present invention, a container comprises a molded thermoplastic composition which can be heat set and which includes a bulk polymer, an additive, and a compatibilizer/emulsifier/surfactant (CES). The container can contain one or more solid layers, cellular layers, or a combination thereof.

According to yet another embodiment of the invention, a food-grade cooking container can be made by thermal crystallization of a non-oriented or substantially non-oriented composition comprising a bulk polymer of an alkylene terephthalate or naphthalate having an intrinsic viscosity of less than 0.95, preferably less than about 0.90, more preferably less than about 0.85, and even more preferably less than about 0.80, wherein the bulk polymer is present in a concentration of at least about 30 wt %, preferably at least about 45 wt %, more preferably at least about 55 wt %, and even more preferably at least about 60 wt %, based on a total weight of the composition. The food-grade container can contain one or more solid layers, cellular layers, or a combination thereof.

According to a further embodiment of the invention, a method of imparting elasticity to an alkylene terephthalate or naphthalate polyester comprises adding to the bulk polymer an effective amount of a substantially amorphous ethylene co-polymer with an acrylate co-monomer concentration of from about 7 wt % to about 40 wt %, based on a total weight of the ethylene co-polymer. Suitable effective amounts of the ethylene co-polymer typically range from about 4 wt % to about 40 wt %, based on the total weight of the bulk polymer and ethylene co-polymer.

According to a further embodiment of the invention, a method of improving processibility of an alkylene terephthalate or naphthalate polyester comprises adding to the bulk polymer an effective amount of a substantially amorphous ethylene co-polymer with an acrylate co-monomer concentration of from about 7 wt % to about 40 wt %, based on a total weight of the ethylene co-polymer. Suitable effective amounts of the ethylene co-polymer typically range from about 4 wt % to about 40 wt %, based on the total weight of the bulk polymer and ethylene co-polymer.

According to another embodiment of the invention, a food-grade thermoplastic composition comprises a bulk polymer, an additive, and a compatibilizer/emulsifier/surfactant (CES).

According to yet another embodiment of the invention, a food-grade cooking container comprises a bulk polymer, an additive, and a compatibilizer/emulsifier/surfactant (CES). The food-grade container can contain one or more solid layers, cellular layers, or a combination thereof.

According to a further embodiment of the invention, a compatibilizer/emulsifier/surfactant (CES) for use with polyester compositions is selected from ethylene/maleic anhydride co-polymer, ethylene/glycidyl methacrylate/ethylhexyl acrylate ter-polymer, ethylene/maleic anhydride/methacrylate ter-polymer, ethylene/maleic anhydride/ethylacrylate ter-polymer, ethylene/maleic anhydride/butylacrylate ter-polymer, ethylene/maleic anhydride/ethylhexylacrylate ter-polymer, and mixtures thereof.

Preferred thermoplastic compositions of the present invention exhibit properties which are especially desirable in food-grade applications. One such property is a relatively low to medium I.V. of PET, which improves extrusion and molding of a heat-set product with improved toughness. Other such properties include high dimensional stability, high temperature resistance, toughness, processibility, and improved molding detail. Further, the composition is thermally stable, resulting in low extractives and less degradation and ensuring food-grade compliance. Such properties render the thermoplastic composition of the present invention especially suitable for use in dual-ovenable containers, which require high dimensional stability and sealability for high-speed packaging and distribution of frozen or refrigerated food products. The ability to use lower-I.V. polyesters permits more economical production of heat-set products having high dimensional stability and resistance to degradation over broad temperature ranges.

DETAILED DESCRIPTION OF THE INVENTION

The thermoplastic composition of the present invention comprises a bulk polymer, an additive, and a compatibilizer/emulsifier/surfactant (CES). The thermoplastic composition can have high dimensional stability, high temperature resistance, and is particularly useful in food-grade applications such as in the manufacture of ovenable (e.g., conventional, convection, and microwave) containers. Preferably, the polyester thermoplastic composition is not oriented prior to thermoforming to provide heat-set containers having dimensional stability at elevated temperatures.

Unless otherwise indicated, all percentages set forth herein are weight percentages based on the total weight of the thermoplastic composition.

As used herein alone or as part of another group, the term "alkyl" or "alk" denotes straight and branched chain saturated hydrocarbon groups, preferably having 1 to 20 carbon atoms, more usually 1 to 6 carbon atoms. Exemplary groups include methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, combinations thereof and the like.

The term "cycloalkyl" as used herein alone or as part of another group, denotes saturated cyclic hydrocarbon ring systems, preferably containing 1 to 3 rings and 3 to 7 carbons per ring. Exemplary groups include cyclopropyl, cyclobutyl, cyclopentyl, cyclohexyl, cycloheptyl, cyclooctyl, cyclodecyl, cyclododecyl, adamantyl and combinations thereof.

The term "alkylene" as used herein denotes divalent, unsaturated hydrocarbon groups of the formula —$C_nH_{2n}$—, wherein n preferably is from 1 to 10. Exemplary groups include methylene, ethylene, and propylene. Such groups represent alkyl groups as defined above from which another hydrogen has been removed.

Intrinsic viscosity (I.V.) as used herein is defined as the limit of the fraction ln (v)/C as C, the concentration of the polymer solution, approaches 0, wherein v is the relative viscosity which is measured at several different concentrations in a 60/40 mixed solvent of phenol and tetrachloroethane at 30° C. Units for I.V. are dl/g unless otherwise indicated.

The bulk polymer of the thermoplastic composition comprises an alkylene terephthalate or naphthalate polyester. Polyalkylene terephthalates can be prepared by the polycondensation reaction of terephthalic acid, or a lower alkyl ester thereof, and aliphatic or cycloaliphatic $C_2$–$C_{10}$ diols. Such reaction products include polyalkylene terephthalate resins, including, but not limited to, polyethylene terephthalate, polybutylene terephthalate, polytetramethylene terephthalate, and copolymers and mixtures thereof. As is known to the art, these polyester resins may be obtained through the polycondensation reaction of terephthalic acid, or a lower alkyl ester thereof, and an alkylene diol. For example, polyethylene terephthalate can be prepared by polycondensation of dimethyl terephthalate and ethylene glycol following an ester interchange reaction. Non-limiting examples of suitable polyesters include polyethylene terephthalate (PET), polybutylene terephthalate (PBT), polyethylene naphthalate (PEN), polycycloterephthalate (PCT), polycycloterephthatlic acid (PCTA), (poly)ethylene-co-1,4-cyclohexanedimethylene terephthalate (PETG), polytrimethylene terephthalate (PTT), and co-polymers and mixtures thereof.

The bulk polymer may be a homopolymer, co-polymer, or blends thereof, and may be straight-chained, branched, or mixtures thereof. In addition, blends of polymers having varying molecular weights and/or intrinsic viscosity (I.V.) may be used. Typically, I.V. ranges from about 0.5 to 1.2. The polymer may be branched by inclusion of small quantities of trihydric or tetrahydric alcohols, or tribasic or tetrabasic carboxylic acids, examples of which include trimellitic acid, trimethylol-ethane, trimethylol-propane, trimesic acid, pentaerythritol and mixtures thereof. The degree of branching preferably is no more than about 3%. The bulk polymer may comprise, in whole or in part, recycled polyesters.

The bulk polymer may contain up to about 25 mol % of other aliphatic dicarboxylic acid groups having from about 4 to about 12 carbon atoms as well as aromatic or cycloaliphatic dicarboxylic acid groups having from about 8 to about 14 carbon atoms. Non-limiting examples of these monomers include iso-phthalic acid (IPA), phthalic acid, succinic acid, adipic acid, sebacic acid, azelaic acid, cyclohexane diacetic acid, naphthalene-2,6-dicarboxylic acid, 4,4-diphenylene-dicarboxylic acid and mixtures thereof.

The bulk polymer also may contain up to about 25 mol % of other aliphatic $C_2$–$C_{10}$ or cycloaliphatic $C_6$–$C_{21}$ diol components. Non-limiting examples include neopentyl glycol, pentane-1,5-diol, cyclohexane-1,6-diol, cyclohexane-1,4-dimethanol, 3-methyl pentane-2,4-diol, 2-methyl pentane-2,4-diol, propane-1,3-diol, 2-ethyl propane-1,2-diol, 2,2,4-trimethyl pentane-1,3-diol, 2,2,4-trimethyl pentane-1,6-diol, 2,2-dimethyl propane-1,3-diol, 2-ethyl hexane-1,3-diol, hexane-2,5-diol, 1,4-di(β-hydroxyethoxy)benzene, 2,2-bis-(4-hydroxypropoxy-phenyl) propane, and mixtures thereof.

Linear alkylene terephthalate or naphthalate homopolymers typically exhibit faster crystallization than do co-polymers. Branched polymers typically yield higher melt strengths. As will be appreciated by those skilled in the art, mixtures of branched- or unbranched homopolymers and/or co-polymers, optionally having varying molecular weights and/or I.V., can be selected to obtain a polymer having the most suitable properties for a particular application.

Polymers having lower I.V. generally have lower molecular weights, shorter chain lengths, and exhibit faster crystallization kinetics, resulting in better heat setting properties (e.g., higher dimensional stability). In addition, lower-I.V. polymers generally are less expensive, and have lower extrusion melt temperatures, resulting in less degradation, faster stress relaxation time, reduced molding time and reduced production time. However, such polymers traditionally are considered unsuitable for making ovenable containers because of poor toughness, low melt strength, poor web handling characteristics, and poor ductility. The present invention advantageously overcomes the drawbacks conventionally associated with the use of lower-I.V. polymers, thereby permitting their use in food-grade, heat-set products.

The bulk polymer of the present invention may contain various impurities. Preferably, impurities that hinder crystallization are held to a minimum. Examples of such impurities include acetaldehyde, diethylene glycol, and isopropyl aldehyde, with preferred maximum concentrations of these components being 2 wt %, 2 ppm, and 5 wt %, respectively, based on the total weight of the bulk polymer. Skilled practitioners can easily identify the impurities that hinder crystallization and the concentration at which they do so. Other additives known in the art may be included in the composition up to about 30% by weight. Non-limiting examples of such additives include antioxidants, flame retardants, reinforcing agents such as glass fiber, asbestos fiber and flake, mineral fillers, stabilizers, nucleating agents, ultraviolet light stabilizers, heat and light stabilizers, lubricants, dyes, pigments, toners, mold release agents, fillers, such as glass beads and talc, and the like. Minor amounts of one or more additional polymers (e.g., up to about 10 percent by weight) optionally can be incorporated in the present composition, such as polyamides, polycarbonates, polyethylenes, and polypropylenes. Antioxidants, thermal stabilizers, fillers, pigments and flame retardant additives, when used, preferably do not exert any adverse effect on impact strength.

The additive component of the thermoplastic composition preferably comprises a co-polymer of an ethylene monomer and a co-monomer that forms a polar moiety such as an acrylate co-monomer. The additive imparts toughness to the thermoplastic composition and makes the composition particularly resistant to thermal treatments which traditionally result in toughness reduction. The polar or semi-polar nature of the additive also improves dispersion and mixing. Examples of suitable co-monomers include acrylates such as methacrylate, butylacrylate, ethylacrylate, ethylhexyl methacrylate, and mixtures thereof. The concentration of the co-monomer should be between (a) a minimum which depends upon the identity of the acrylate and (b) an amount slightly less than the amount that makes the co-polymer amorphous or substantially amorphous. For example, when methacrylate is used, its concentration preferably is from about 20 wt % to about 35 wt %, based on the total weight of the ethylene/methacrylate co-polymer. Typical preferred acrylate concentrations range from about 7 wt % to about 40 wt % and more typically from about 17 wt % to about 35 wt %, based on the total weight of the co-polymer. The average molecular weight of the co-polymer typically ranges from about 50,000 to about 120,000. The melt flow index of the additive preferably is less than about 7, more preferably is less than about 3, and even more preferably is less than about 2 g/10 min. The additive preferably has a relatively low melting point and is thermally stable, e.g., does not degrade during extrusion of the thermoplastic composition or during redrying of the thermoplastic composition in air for extended times.

The concentration of the additive component in the thermoplastic composition may be suitably selected according to properties required for desired end uses of the composition. Typically, the concentration of the additive is from about 4 wt % to about 40 wt %, more typically from about 4 wt % to about 30 wt %, and even more typically from about 6 wt % to about 15 wt %, based on the total weight of the composition.

The additive co-polymer preferably has a major portion of ethylene, typically at least about 60 wt % and preferably at least about 70 wt %, based on the total weight of the additive. The co-polymer also may contain one or more alpha-olefins having 3 to 10 or more carbon atoms. Illustrative examples include propylene, butene-1, pentene-1,3-methylbutene-1, hexene-1, octene-1, decene-1, 4,4-dimethylpentene-1, 4,4-diethyl-hexene-1, 3,4-dimethylhexene-1, 4-butyl-1-octene, 5-ethyl-1-decene, 3,3-dimethyl-butene-1,mixtures thereof and the like. The preferred ethylene co-polymer comprises up to about 5 wt % of other alpha-olefins as described above. In addition, the additive optionally contains a core-shell toughener. Examples of core-shell tougheners which can be used are described in U.S. Pat. No. 5,409,967, the disclosure of which is incorporated by reference herein in its entirety.

The compatibilizer/emulsifier/surfactant (CES) preferably is a grafted or backbone-based co-polymer or ter-polymer comprising ethylene and a glycidyl acrylate, such as glycidyl methacrylate, and/or maleic anhydride. The CES co-polymer or ter-polymer preferably also includes other acrylates such as methacrylate, ethylacrylate, propylacrylate, butylacrylate, ethylhexylacrylate, etc. Suitable exemplary amounts of glycidyl acrylate, maleic anhydride, or mixture thereof, range from about 0.1 wt % to about 12 wt %, typically from about 1 wt % to about 10 wt %, and more typically from about 2 wt % to about 8 wt %, based on the total weight of the co-polymer or ter-polymer. A grafted co-polymer or ter-polymer typically will have less glycidyl acrylate or maleic anhydride (e.g., from about 0.2 wt % to about 1.5 wt %), whereas a backbone-based co-polymer or ter-polymer can have higher amounts of glycidyl acrylate and/or maleic anhydride, e.g., as indicated above. Suitable exemplary amounts of acrylate range from 0 to about 40 wt %, preferably from about 10 wt % to about 30 wt %, and even more preferably from about 20 wt % to about 35 wt %, based on the total weight of the co-polymer or ter-polymer.

Typically, the concentration of the CES in the thermoplastic composition is from about 0.1 wt % to about 8 wt %, more typically is from about 0.2 wt % to about 6 wt %, and even more typically is from about 0.4 wt % to about 4 wt %. The melt flow index of the CES preferably is less than about 20, more preferably is less than about 10, and even more preferably is less than about 6 g/10 min.

In one preferred embodiment of the present invention, the CES comprises a ter-polymer of ethylene with about 8 wt % glycidyl methacrylate and about 25 wt % methacrylate or butylacrylate, based on the total weight of the ter-polymer. In another preferred embodiment, the CES comprises a co-polymer of ethylene with about 6 wt % glycidyl methacrylate, based on the total weight of the co-polymer. In another preferred embodiment, the CES comprises a ter-polymer of ethylene with about 2 wt % glycidyl methacrylate and from about 17 to 25 wt % methacrylate, based on the total weight of the ter-polymer. In yet another preferred embodiment, the CES comprises a ter-polymer of ethylene with about 3 wt % maleic anhydride and about 17 wt % butylacrylate, based on the total weight of the ter-polymer.

A cellular sheet can be made utilizing the thermoplastic composition of the present invention. Such cellular sheeting can be made by mixing at least one inert gas with molten thermoplastic resin composition in an extruder. This is done by simply injecting the inert gas into the molten resin in the extruder which is equipped with a sheet forming die. The inert gas used in this process can be any gas which does not chemically react with the thermoplastic resin composition at the elevated processing temperatures required. Some representative examples of inert gases which can be used include nitrogen, carbon dioxide, helium, neon, argon, and krypton. For purposes of cost savings and solubilities, nitrogen, carbon dioxide, or mixtures thereof normally will be used as the inert gas.

A cellular sheet can be made with either a plasticating extruder or a melt extruder. Screw extruders of these type push the molten thermoplastic resin composition containing discrete cells of the inert gas through a metal die that continuously shapes the sheet into the desired form. In most cases, single screw extruders will be utilized. However, in some cases it may be desirable to utilize twin screw extruders or multiple screw extruders which perform essentially the same function.

In many cases it will be convenient to employ a plasticating extruder of the single screw design. The thermoplastic resin composition is fed into such a plasticating extruder by gravitational flow from a hopper into the screw channel. The thermoplastic resin composition fed into the plasticating extruder is initially in particulate solid form. The thermoplastic resin composition initially enters the solid conveying zone of the plasticating extruder. In the solid conveying zone, the solid resin is conveyed and compressed by a drag-induced mechanism. In the solid conveying zone, the resin is mixed, heated, and conveyed through the extruder toward the melting zone. This heating is provided by maintaining the barrel of the extruder at an elevated temperature. The barrel of the extruder is typically heated electrically or by a fluid heat exchanger system. Thermocouples are also normally placed in the metal barrel wall to record and to help control barrel temperature settings.

Melting occurs in the melting zone after the resin is heated to a temperature which is above its melting point. In the melting zone, melting, pumping and mixing simultaneously occur. The molten resin is conveyed from the melting zone to the melt conveying zone. The inert gas is injected into the molten resin in the melt conveying zone. In the melt conveying zone, pumping and mixing simultaneously occur. The molten resin in the melt conveying zone is maintained at a temperature which is well above its melting point. A sufficient amount of agitation is provided so as to result in an essentially homogeneous dispersion of inert gas bubbles throughout the molten resin. The molten resin entering the melt conveying zone from the melting zone is at a somewhat lower temperature and accordingly is of a higher viscosity. This essentially prevents the inert gas from back mixing through the extruder and escaping from the solid conveying zone via the hopper.

The molten thermoplastic resin composition in the melt conveying zone typically is pumped into a metering pump and finally extruded through a sheet-forming die. The metering pump and sheeting die are typically maintained at a lower temperature than that of the barrel surrounding the melt conveying zone to minimize rupture and diffusion of inert gas bubbles in the thermoplastic resin composition. The sheeting die is of a generally rectangular design which is quite wide and of a small opening. Upon exiting the sheeting die, the sheet extrudate will swell to a level which is dependent upon the melt temperature, the die length-to-opening ratio, and the shear stress at the die walls. In some cases, such as in the manufacture of clam shells, it is desirable to use a circular die and to extrude a tube which can be slit open and thermoformed. The cellular sheet produced typically is cooled without stretching by convected cold air or an inert gas, by immersion into a fluid bath, or by passage over chilled rolls. The cellular sheet produced is generally amorphous in nature.

The cellular sheet typically will contain a sufficient amount of inert gas cells to provide it with a density which is within the range of about 0.4 to about 1.25. In most cases, the cellular sheet will contain a quantity of inert gas cells to provide it with a density which is within the range of 0.7 to 1.1. It generally is preferred for the cellular sheet to have a density which is within the range of about 0.8 to about 1.0.

The cellular sheet can be thermoformed into heat-set, thin walled articles utilizing conventional thermoforming equipment. Such thermoforming typically is done by (1) preheating the substantially amorphous cellular sheet until it softens and positioning it over the mold; (2) drawing the preheated sheet onto the heated mold surface; (3) heat-setting the formed sheet by maintaining sheet contact against the heated mold for a sufficient time period to partially crystallize the sheet; and (4) removing the part out of the mold cavity. In currently available thermoforming processes, the level of crystallinity of the preformed sheet should not exceed about 10%.

The preheating of the substantially amorphous, cellular sheet prior to positioning over the thermoforming mold is necessary in order to achieve the very short molding times required for a viable commercial process. The sheet must be heated above its $T_g$ and below the point at which it sags excessively during positioning over the mold cavity. In the thermoforming process, a sheet temperature which is within the range of about 130° C. to about 210° C. and a mold temperature which is within the range of about 140° C. to about 220° C. will normally be utilized. It is often preferred to use a sheet temperature which is within the range of about 155° C. to about 185° C. and a mold temperature which is within the range of about 165° C. to about 195° C.

The invention can be practiced by using any of the known thermoforming methods including vacuum assist, air assist, mechanical plug assist or matched mold. The mold should be preheated to a temperature sufficient to achieve the degree of crystallinity desired. Selection of the optimum mold temperature is dependent upon the type of thermoforming equipment, configuration and wall thickness of the article being molded and other factors.

Heat-setting is a term describing the process of thermally inducing crystallization of a polyester article in a restrained position. In the practice of the invention, heat-setting can be achieved by maintaining intimate contact of the solid or cellular sheet with the heated mold surface for a sufficient time to achieve a level of crystallinity which gives adequate physical properties to the finished part. For containers to be used in high temperature food application, a level of crystallinity above 15% is preferable for adequate dimensional stability during demolding operations, and more preferably is above about 20% to yield parts with excellent dimensional stability and impact resistance.

The heat-set part can be removed from the mold cavity by known means. One method, blow back, involves breaking the vacuum established between the mold and the formed sheet by the introduction of compressed air. In commercial thermoforming operation, the part is subsequently trimmed and the scrap ground and recycled.

Since a partially-crystalline finished article is necessary for good dimensional stability at high temperatures, knowledge of the degree of crystallinity or percent of crystallinity is of considerable importance. The crystallinity of the polymer in such articles will normally be measured by Differential Scanning Calorimetry (DSC). The terms crystallization temperature and crystallization onset are used interchangeably to mean the temperature or temperature range in which a regularly repeating morphology, brought about by a combination of molecular mobility and secondary bonding forces, is induced in a polymer over a molecular distance of at least several hundred angstroms. The crystallization temperature or crystallization onset can be visually observed as the point at which a substantially amorphous, non-oriented sheet of polymer changes from a translucent, hazy appearance to a white appearance.

As used throughout this specification and the appended claims, the term glass transition temperature ($T_g$) means that temperature or temperature range at which a change in slope appears in the volume versus temperature curve for said polymer and defining a temperature region below which the polymer exhibits a glassy characteristic and above which the polymer exhibits a rubbery characteristic. The glass transition temperature of polyethylene terephthalate is about 70° C.

According to another aspect of the invention, a multi-ply article can be produced by co-extrusion of two or more polymeric compositions. This technique may be used, e.g., for aesthetic purposes, such as in making a two-tone, ovenable container. If desired, two polymeric layers can be co-extruded to "sandwich" a third layer. As will be appreciated by those skilled in the art, a food-grade composition can be extruded over a non-food grade composition to prepare an ovenable container. Preferred thermoplastic compositions of the present invention have good sealability, e.g., permit packaging of refrigerated foods under pressure and the like. In some instances it may be desirable to extrude a more amorphous layer over a highly crystalline layer, e.g., as in hermetic sealing. Such additional layers may be selected from a wide variety of oriented and non-oriented films of homo-polymers, co-polymers, and mixtures thereof which can be straight-chained, branched, or mixtures thereof. Examples of such polymers include polyesters such as PET, PEN, PETG, PCT, PCTA, PBT, PTT, and mixtures thereof Suitable methods which can be used for co-extrusion are described in U.S. Pat. Nos. 4,533,510, 4,929,482, and 5,318,811. A multi-ply article can have one or more solid layers and/or one or more cellular layers, which can be sequenced in any desired configuration.

A food-grade container can be prepared using a pre-dried thermoplastic composition containing polyethylene terephthalate (PET) having an I.V. of less than 0.95, 0.90, 0.85, or 0.80 (available from Shell Polyester), an additive, and a CES as described above. The thermoplastic composition can be pre-dried, physically dry blended by weight, dried, melt mixed, devolitized, and processed through an extrusion die to form a sheet of desired thickness, using a single screw extruder, a twin screw extruder, or a multi-machine system (co-extruder). A multi-machine system can be used to apply a skin on one or two sides to form a multi-ply article, e.g., to enhance sealing, aesthetics, gloss, color, and the like. For example, because higher-crystallinity films usually are more difficult to seal, it may be advantageous to apply a second, more amorphous film, such as PETG or an iso-phthalic acid (IPA)/PET co-polymer, over a more crystalline first layer.

The single or multi-ply sheet can be fed over one or more sets of shaping rolls. The shaping rolls cool the surface of the sheet to establish a thermal gradient in the sheet while maintaining the plastic mass at a temperature suitable for vacuum forming. The rolls also can be used to enable laminations, to emboss the article, and the like. The result is a sheet of plastic having both a temperature gradient established therein and a bulk temperature at which vacuum forming can be carried out.

The sheet then can be brought into contact with an assembly of heated female molds and optional secondary cooling molds. Either continuous, semi-continuous, or discontinuous processes can be used, which require different heat/cool/reheat sequences. The molds can be vented so that vacuum may be drawn in the mold. A vacuum is drawn within the mold, which draws the sheet into the mold to form an article in the shape of the mold. In this way, the sheet will be drawn into contact with the temperature-controlled mold, and any air trapped between the sheet and the mold will be removed through the vent perforations.

The desired degree of crystallinity in regions of the formed article is different from that in other regions. Therefore, it is preferred that while the thus-formed but still plastic article is in contact with the mold, regions of the mold are selectively heated so as to increase the rate of crystallization and/or to stress-release the part. Region of the mold also can be selectively cooled to decrease the rate of crystallization relative to other regions to achieve the desired degree of crystallinity in each region. The various regions of the article in the mold are maintained at temperatures which yield an article having desired characteristics in the various regions defined by the various temperature zones.

The various regions of the article in the mold typically are maintained at temperatures sufficient to ensure that the bottom portion of the article has the highest degree of crystallization, i.e., is the warmest portion; the top flange portion of the article is the least crystalline portion, i.e., is the coolest portion; and the remaining portions of the article between the bottom and the flange (i.e., the sides) are at intermediate temperature(s). In this way, the bottom and the side have a higher degree of crystallization than does the flange of the formed article. The bottom thus has the highest heat resistance.

The article can be maintained in the mold at pre-selected temperatures for a time sufficient to form the article. Formed articles may be removed from the mold by removing the articles and the web of plastic between them (the "trim")

from the forming apparatus as a unit, with the formed articles then separated from the trim and optionally relocated into a second mold at a specific temperature. Alternatively, the formed articles can be separated from the trim while the articles are still in the molds. The trim is recovered separately from the individual articles. The individual articles are ejected from the molds, and then are further processed. Without regard to which article/web separation technique is used, at no time should the web be tensioned in either direction, thus distorting the shaped product.

Surprisingly, the composition is particularly resistant to thermal treatments which traditionally cause toughness reduction due to coarsening of the toughener phase and an increase in crystallinity of the matrix resin.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A rigid thermally crystalline dual-ovenable food container made from a thermoplastic polymeric composition comprising:

an alkylene terephthalate or naplithalate bulk polymer;

an additive in a concentration from about 4 wt % to about 40 wt %, based on a total weight of the composition, comprising a substantially amorphous co-polymer of ethylene and an acrylate; and a compatibilizer/emulsifier/Surfactant (CBS) in a concentration from about 0.1 wt % to about 8 wt %, based on the total weight of the composition, comprising a grafted or backbone ter-polymer of ethylene and a glycidyl acrylate or maleic anhydride, and an acrylate selected from the group consisting of methylacrylate, ethylacrylate, propylacrylate, butylacrylate, ethylhexylacrylate, and mixtures thereof;

wherein said container maintains dimensional stability at temperatures of about 250° F. and wherein said thermoplastic polymeric composition comprises reprocessed waste.

2. The container of claim 1 wherein said bulk polymer is selected from the group consisting of PET, PEN, PETG, PCT, PCTA, PBT, PTT, and mixtures thereof.

3. The container of claim 1 wherein said bulk polymer comprises one or more linear or branched homo-polymers, co-polymers, recycled polyesters, or a mixture thereof.

4. The container of claim 1 wherein said additive is selected from the group consisting of ethylene/methylacrylate co-polymer, ethylene/butylacrylate co-polymer, ethylene/ethylacrylate co-polymer, ethylene/ethylhexyl-acrylate co-polymer, and mixtures thereof, and optionally contains a core-shell toughener.

5. The container of claim 4 wherein said additive comprises from about 7 wt % to about 40 wt % of said acrylate, based on a total weight of said co-polymer.

6. The container of claim 5 wherein said additive comprises from about 17 wt % to about 35 wt % of said acrylate, based on the total weight of said co-polymer.

7. The container of claim 6 wherein the concentration of said additive is from about 4 wt % to about 30 wt %, based on the total weight of the composition.

8. The container of claim 7 wherein the concentration of said additive is from about 6 wt % to about 15 wt %.

9. The container of claim 1 wherein said CES is selected from the group consisting of ethylene/glycidyl methacrylate/ methacrylate ter-polymer, ethylene/glycidyl methylacrylate/ ethylacrylate ter-polymer, ethylene/glycidyl methacrylate/ butylacrylate ter-polymer, ethylene/glycidyl methacrylate/ ethylhexylacrylate ter-polymer, ethylene/maleic anhydride/ methacrylate ter-polymer, ethylene/maleic anhydride/ ethylacrylate ter-polymer, ethylene/maleic anhydride/ butylacrylate ter-polymer, ethylene/maleic anhydride/ ethylhexylacrylate ter-polymer, and mixtures thereof.

10. The container of claim 9 wherein said CBS concentration is from about 0.2 wt % to about 6 wt %, based on the total weight of the composition.

11. The container of claim 1 wherein said CBS comprises a polymer having from 0 to about 40 wt % of said acrylate and from about 0.1 to about 12 wt % of said glycidyl acrylate or maleic anhydride, based on a total weight of the ter-polymer.

12. The container of claim 11 wherein said CBS comprises a ter-polymer having from about 10 wt % to about 30 wt % of said acrylate.

13. The container of claim 11 wherein said CES ter-polymer has from about 1 wt % to about 10 wt % of said glycidyl acrylate or maleic anhydride.

14. The container of claim 1 wherein said bulk polymer has a degree of thermally induced crystallinity of at least about 20%.

15. The container of claim 1 wherein said bulk polymer has a degree of thermally induced crystallinity of less than about 15%.

16. The container of claim 1 wherein said bulk polymer has an intrinsic viscosity of less than about 0.95.

17. The container of claim 16 wherein said intrinsic viscosity is less than about 0.90.

18. The container of claim 17 wherein said intrinsic viscosity is less than about 0.85.

19. The container of claim 18 wherein said intrinsic viscosity is less than about 0.80.

20. The container of claim 1 which maintains dimensional stability for thermal treatments or sterilization at 250° F. and below.

21. The container of claim 1 which maintains dimensional stability for thermal treatments or sterilization at 250° F. and above.

22. The container of claim 1, wherein said thermoplastic polymeric composition is heat-set, the container further comprising a second, polymeric layer laminated to or co-extruded onto a first surface of said thermoplastic polymeric composition.

23. The container of claim 22 wherein said second layer is substantially non-oriented.

24. The container of claim 22 wherein said second layer is oriented.

25. The container of claim 22 wherein said second layer is selected from the group consisting of PET, PEN, PETG, PCT, PCTA, PBT, PTT, and mixtures thereof.

26. The container of claim 22 further comprising a third, polymeric layer laminated to or co-extruded onto a second surface of said thermoplastic polymeric composition.

27. The container of claim 26 wherein said third layer is substantially non-oriented.

28. The container of claim 26 wherein said third layer is oriented.

29. The container of claim 26 wherein said third layer is selected from the group consisting of PET, PEN, PETG, PCT, PCTA, PBT, PTT, and mixtures thereof.

30. The container of claim 1 comprising one or more solid layers, cellular layers, or a combination thereof.

31. The container of claim 1 further comprising a second, polymeric layer laminated to or co-extruded onto said thermoplastic polymeric composition prior to forming said container.

32. The container of claim 1 further comprising a second, polymeric layer adhered to a flange portion of said container.

33. The container of claim 1 wherein said container maintains dimensional stability without the need for inorganic fibers.

34. The container of claim 1 which is a heat set, crystalline polyethylene terephthalate (CPET) food container.

35. The container of claim 1 wherein said bulk polymer comprises a blend of alkylene terephthalate or naphthalate polymers having different intrinsic viscosities.

36. The container of claim 1 wherein said thermoplastic polymeric composition further comprises one or more pigments, anti-oxidants, stabilizers, or a combination thereof.

37. A microwave-ovenable food container made from a thermoplastic polymeric composition comprising:
- an alkylene terephthalate or naphthalate bulk polymer:
- an additive in a concentration from about 4 wt % to about 40 wt %, based on a total weight of the composition, comprising a substantially amorphous co-polymer of ethylene and an acrylate: and
- a compatibilizer/emulsifier/surfactant (CES) in a concentration from about 0.1 wt % to about 8 wt %, based on the total weight of the composition, comprising a grafted or backbone ter-polymer of ethylene and a glycidyl acrylate or maleic anhydride, and an acrylate selected from the group consisting of methylacrylate, ethylacrylate, propylacrylate, butylacrylate, ethylhexylacrylate, and mixtures thereof.

38. A conventional-ovenable food container made from a thermoplastic polymeric composition comprising:
- an alkylene terephthalate or naphthalate bulk polymer;
- an additive in a concentration from about 4 wt % to about 40 wt %, based on a total weight of the composition, comprising a substantially amorphous co-polymer of ethylene and an acrylate: and
- a compatibilizer/emulsifier/surfactant (CES) in a concentration from about 0.1 wt % to about 8 wt % based on the total weight of the composition, comprising a grafted or backbone ter-polymer of ethylene and a glycidyl acrylate or maleic anhydride, and an acrylate selected from the group consisting of methylacrylate, ethylacrylate, propylacrylate, butylacrylate, ethylhexylacrylate, and mixtures thereof.

39. A convection-ovenable food container made from a thermoplastic polymeric composition comprising:
- an alkylene terephthalate or naphthalate bulk polymer: an additive in a concentration from about 4 wt % to about 40 wt %, based on a total weight of the composition, comprising a substantially amorphous co-polymer of ethylene and an acrylate: and
- a compatibilizer/emulsifier/surfactant (CES) in a concentration from about 0.1 wt % to about 8 wt %, based on the total weight of the composition, comprising a grafted or backbone ter-polymer of ethylene and a glycidyl acrylate or maleic anhydride, and an acrylate selected from the group consisting of methylacrylate, ethylacrylate, propylacrylate, butylacrylate, ethylhexylacrylate, and mixtures thereof.

40. A dual-ovenable food container made from a thermoplastic polymeric composition comprising:
- an alkylene terephthalate or naphthalate bulk polymer;
- an additive in a concentration from about 4 wt % to about 40 wt %, based on a total weight of the composition, comprising a substantially amorphous co-polymer of ethylene and an acrylate: and
- a compatibilizer/emulsifier/surfactant (CES) in a concentration from about 0.1 wt % to about 8 wt %, based on the total weight of the composition, comprising a grafted or backbone ter-polymer of ethylene and a glycidyl acrylate or maleic anhydride, and an acrylate selected from the group consisting of methylacrylate, ethylacrylate, propylacrylate, butylacrylate, ethylhexylacrylate, and mixtures thereof.

41. A dual-ovenable food tray made from a heat set, crystalline polyethylene terephthalate (CPET) material composition consisting essentially of:
- a polyethylene terephthalate bulk polymer;
- an additive in a concentration from about 4 wt % to about 15 wt %, based on a total weight of the composition, comprising a substantially amorphous co-polymer of ethylene and an acrylate; and
- a compatibilizer/emulsifier/surfactant (CBS) in a concentration from about 0.1 wt % to less than 4 wt %, based on the total weight of the composition, comprising a grafted or backbone co-polymer or ter-polymer of ethylene and a glycidyl acrylate or maleic anhydride, and optionally an acrylate selected from the group consisting of methylacrylate, ethylacrylate, propylacrylate, butylacrylate, ethylhexylacrylate, and mixtures thereof.

42. The dual-ovenable food tray of claim 41 wherein said bulk polymer includes one or more linear or branched homo-polymers, co-polymers, recycled polyesters, or a mixture thereof.

43. The dual-ovenable food tray of claim 41 wherein said additive is selected from the group consisting of ethylene/methylacrylate co-polymer, ethylene/butylacrylate co-polymer, ethylene/ethylacryl ate co-polymer, ethylene/ethylhexyl-acrylate co-polymer, and mixtures thereof, and optionally contains a core-shell toughener.

44. The dual-ovenable food tray of claim 43 wherein said additive comprises from about 7 wt % to about 40 wt % of said acrylate, based on a total weight of said co-polymer.

45. The dual-ovenable food tray of claim 44 wherein said additive comprises from about 17 wt % to about 35 wt % of said acrylate, based on the total weight of said co-polymer.

46. The dual-ovenable food tray of claim 41 wherein said CES is selected from the group consisting of ethylene/glycidyl methyl acrylate co-polymer, ethylene/maleic anhydride co-polymer, ethylene/glycidyl methacrylate/methacrylate ter-polymer, ethylene/glycidyl methylacrylate/ethylacrylate ter-polymer, ethylene/glycidyl methacrylate/butylacrylate ter-polymer, ethylene/glycidyl methacrylate/ethylhexylacrylate ter-polymer, ethylene/maleic anhydride/methacrylate ter-polymer, ethylene/maleic anhydride/ethylacrylate ter-polymer, ethylene/maleic anhydride/butylacrylate ter-polymer, ethylene/maleic anhydride/ethylhexylacrylate ter-polymer, and mixtures thereof.

47. The dual-ovenable food tray of claim 46 wherein said CES is a co-polymer or ter-polymer having from 0 to about 40 wt % of said acrylate and from about 0.1 to about 12 wt % of said glycidyl acrylate or maleic anhydride, based on a total weight of the co-polymer or ter-polymer.

48. The dual-ovenable food tray of claim 47 wherein said CBS is a ter-polymer having from about 10 wt % to about 30 wt % of said acrylate.

49. The dual-ovenable food tray of claim 47 wherein said CBS co-polymer or ter-polymer has from about 1 wt % to about 10 wt % of said glycidyl acrylate or maleic anhydride.

50. The dual-ovenable food tray of claim 44 which has a second, polymeric layer laminated to or co-extruded onto a first surface of said CPET material composition.

51. The dual-ovenable food tray of claim 41 which has a second, polymeric layer adhered to a flange portion of said tray.

52. The dual-ovenable food tray of claim 41 wherein said CPET material composition includes one or more pigments, anti-oxidants, stabilizers, or a combination thereof.

* * * * *

UNITED STATES PATENT AND TRADEMARK OFFICE
CERTIFICATE OF CORRECTION

PATENT NO. : 6,576,309 B2
DATED : June 10, 2003
INVENTOR(S) : Edward J. Dalgewicz, III et al.

It is certified that error appears in the above-identified patent and that said Letters Patent is hereby corrected as shown below:

<u>Title page,</u>
Item [54], Title, replace "COMPOSITIONS" with -- CONTAINERS --.

<u>Column 13,</u>
Line 31, replace "Surfactant (CBS)" with -- surfactant (CES) --.

<u>Column 14,</u>
Lines 9, 12 and 17, replace "CBS" with -- CES --.
Line 13, replace "polymer" with -- ter-polymer --.

<u>Column 16,</u>
Line 20, replace "(CBS)" with -- (CES) --.
Line 36, replace "ethylacryl ate" with -- ethylacrylate --.
Line 47, replace "methyl acrylate" with -- methylacrylate --.
Lines 63 and 66, replace "CBS" with -- CES --.

<u>Column 17,</u>
Line 1, replace "claim 44" with -- claim 41 --.

Signed and Sealed this

Twenty-first Day of March, 2006

JON W. DUDAS
*Director of the United States Patent and Trademark Office*